United States Patent [19]
Bux et al.

[11] Patent Number: 4,510,493
[45] Date of Patent: Apr. 9, 1985

[54] METHOD AND ARRANGEMENT FOR LOCAL ADDRESS ACQUISITION BY A STATION IN A COMMUNICATION SYSTEM

[75] Inventors: Werner K. Bux, Richterswil; Heinrich J. Keller, Ruschlikon; Hans R. Mueller, Langnau, all of Switzerland

[73] Assignee: International Business Machines Corp., Armonk, N.Y.

[21] Appl. No.: 440,935

[22] Filed: Nov. 12, 1982

[30] Foreign Application Priority Data

Dec. 29, 1981 [EP] European Pat. Off. ...... 81.11.0820.8

[51] Int. Cl.³ .............................................. H04Q 9/00
[52] U.S. Cl. ........................... 340/825.05; 340/825.22; 340/825.52
[58] Field of Search ....................... 340/825.05, 825.22, 340/825.52; 370/86, 89

[56] References Cited

U.S. PATENT DOCUMENTS

| | | | |
|---|---|---|---|
| 3,961,139 | 6/1976 | Bowman et al. | 370/89 |
| 4,078,228 | 3/1978 | Miyazaki | 370/89 |
| 4,335,426 | 6/1982 | Maxwell et al. | 370/86 |
| 4,418,333 | 11/1983 | Schwarzbach et al. | 340/825.22 |
| 4,438,432 | 3/1984 | Hurcum | 370/86 |

Primary Examiner—Donald J. Yusko
Attorney, Agent, or Firm—John B. Frisone

[57] ABSTRACT

In a local communication network, stations can be attached via extension lines and individual ports in distribution panels to the main transmission ring (11). Each port has a physical address or local identification key. Means are provided for inserting the local key of a port into a station when it is plugged into the extension lines. Each station comprises units (33, 45) for generating a key demand signal and an idling signal pattern which are transmitted to the port, and a key register (47) for recording the key when it is received. Each port includes a read-only store and timing unit (41) which furnishes the local key in response to the received idling pattern which is converted to a clock signal. A switch (37) in the port is activated by a switch control unit (35) to insert the read-only store and timing unit into a wrap-around loop interconnecting input and output paths of the station.

10 Claims, 6 Drawing Figures

METHOD AND ARRANGEMENT FOR LOCAL ADDRESS ACQUISITION BY A STATION IN A COMMUNICATION SYSTEM

Present invention is concerned with a method and an arrangement for acquiring a physical address or a local identification key by a station when it is connected to the transmission network of a communication system.

In local communication systems, data stations have to be identified by addresses so that a message directed to any station or transmitted from any station can be properly identified.

An address or station identification can be wired-in to the device, however, since uniqueness of the addresses has to be guaranteed, address administration becomes rather difficult. Therefore, it is more desirable to have the address dynamically assigned as an address word or key. In this case, the address has to be loaded into a register or storage unit when the station is being attached to the communication system and starts operating. The address can either be a predetermined address for the respective station, or it can be any system address which is assigned to the respective station upon request by a central device comprising an address directory or an address server unit.

A procedure for address assignment to a station when it is activated is known from the publication "Satellite Station Address Assignment Method" by R. L. Arndt, IBM Technical Disclosure Bulletin, Vol. 22, No. 5, October 1979, pp. 2063 and 2064. In this procedure, a newly inserted station initially assigns itself a predetermined address. When a master station next polls this address, the newly inserted station will respond, and the master station will select the next available address from a table and will assign it to the new station.

This procedure has the disadvantage that if a plurality of stations are newly inserted, all will have the same initial address and respond simultaneously to the poll so that a contention resolution procedure will be necessary. Furthermore, a master station keeping an address table is required for address assignment, and any assigned address will not reflect the physical location of the inserted station.

In a large communication system interconnecting a great number of stations, it is desirable to have an address or key for each station which identifies its physical location in the network. Such physical addresses simplify network maintenance and enable rapid determination of the location of a faulty station as well as elimination of the fault or reconfiguration to keep the system operable.

An article by A. X. Widmer "Topographical Addressing on Loops", published in the IBM Technical Disclosure Bulletin, Vol. 15, No. 2, July 1972, pp. 380–382 discloses a method for addressing devices attached to a communication loop. A loop controller keeps a table of the sequential order of all devices currently connected to the loop. For addressing a device, the controller inserts the sequential count of the respective device into an address field. Each device decrements the address of a received message by one, and the device detecting an all zeros address accepts the message.

Though this method allows topographical addressing, it requires the updating of a table in the controller each time a station is inserted or removed, involving the changing of many addresses. Furthermore, station-to-station communication is not possible without controller participation by this method. Another disadvantage is that the address must be handled, i.e. decremented by each station so that if an error occurs in any one station, the respective message will be addressed to the wrong station.

The publication "Terminal Addressing Method and Apparatus" by P. Abramson, IBM Technical Disclosure Bulletin, Vol. 21, No. 12, May 1979, pp. 4954–4957, describes a similar method that allows addressing of terminals in dependance of their sequential position. The disadvantages mentioned above apply also to this addressing method. It should also be noted that the addressing techniques described in the Widmer and Abramson articles do not actually use addresses which identify the current physical location of each station or terminal, but only its relative sequential position.

It is an object of the present invention to devise a method and an arrangement for acquiring a physical address or location identification key by a station which is connected to a communication network.

A further object of the invention is a physical address acquisition technique for data stations which operates automatically and does not require the intervention of a human operator or of a central monitor or controller.

It is a further object of this invention to provide a local identification key acquisition method and arrangement which require a minimum in additional hardware and operation time with respect to known systems and address assignment methods.

The method and the arrangement for achieving these properties in station address acquisition are defined in claims 1 and 4, respectively.

A preferred embodiment of the invention is disclosed in the following in connection with drawings. In the drawings.

DETAILED DESCRIPTION

Figure 1:
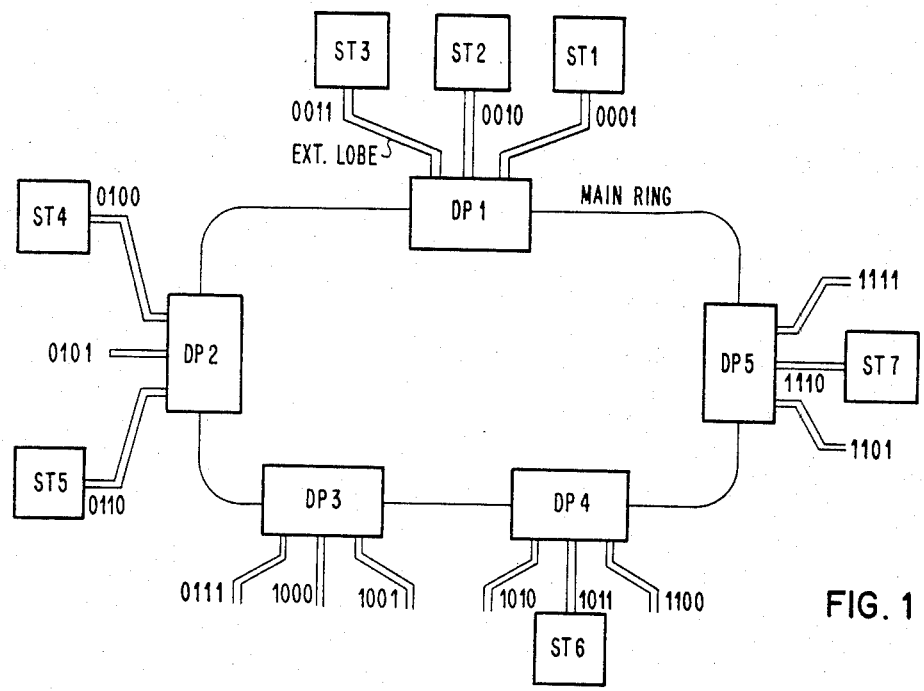
FIG. 1 is a schematic representation of a ring communication system with multi-port distribution panels for attaching stations in which present invention finds application.

FIG. 1 is a schematic overview of a local communication system in which present invention finds application. A closed communication ring, e.g. a coaxial cable interconnects several rooms or buildings of an establishment which may be a factory, a municipal administration, etc. The ring includes a number of wiring concentrators or distribution panels DP1 . . . DP5 by which data terminals such as stations ST1 . . . ST7 can be attached to the ring. The stations may be display units including key-boards, communicating typewriters or the like.

Each distribution panel has a plurality of ports, each for connecting one station. The distribution panels can be placed at strategic and protected places in the building so that the wiring for the main ring can be kept rather straight. Wiring from each distribution panel to its stations is radial, i.e. from each port a local extension leads to a wall receptacle or outlet in a room, and a station can be connected by a plug and a relatively short cable to the wall outlet. Such an arrangement facilitates the systematic pre-wiring of a building. If desirable, powering of the distribution panel relays can be effected from the attached stations through the local extension lines.

When a station is inserted, the ring is interrupted and the station plus its connecting cable and the wire between wall outlet and port form an extension lobe of the ring. When no station is connected to a port, the port is bypassed so that the main ring is kept closed.

In the proposed system each port has its own address by which any station that will be attached to it can be identified. In the example shown in FIG. 1, five distribution panels are provided each having three ports. Thus, fifteen stations can be attached to the ring, and each port is assigned a 4-bit address as shown in the drawing. Of course, any other number of distribution panels can be used, and the number of ports per distribution panel can vary, e.g. between one and eight.

Instead of sequential addresses as shown in FIG. 1, structured addresses having a panel portion and a port portion could be used. E.g., if 8-bit addresses were used, the first five bits could identify one out of 32 distribution panels, and the last three bits would be used for identifying one out of eight possible ports in the respective distribution panel.

In a local communication system, it is often necessary to change the configuration, e.g. by moving a station from one room to another, by temporarily concentrating several stations in a specific area, or to replace a station by another one having additional functions. In all these cases, stations should be identifiable by the physical address which is assigned to the respective port i.e. an address representing the geographic location of the station. The physical or location address will also be designated as "key" in this specification.

The invention to be described in the following allows to furnish such a physical address or key to a station when it is inserted into the ring, with a minimum in overhead operations and extra hardware.

Figure 2:
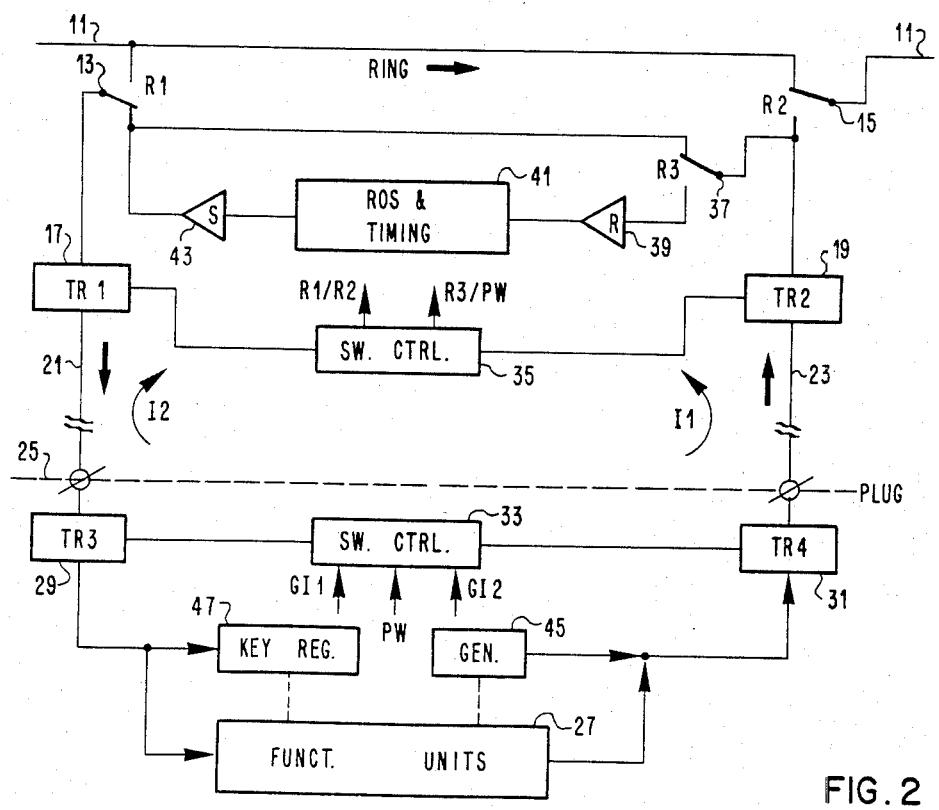
FIG. 2 shows in a block diagram the portions of a distribution panel port and of a connected station, which are important for present invention.

FIG. 2 shows in a block diagram those parts of a station and of one port of a distribution panel which are important for the embodiment of the invention to be described.

In the distribution panel, each port has two relay switches 13 (R1) and 15 (R2) connected to transmission ring 11 for inserting or bypassing an attached station. Switches R1 and R3 are connected via transformers 17 (TR1) and 19 (TR2) and by extension lines 21 and 23 to a wall outlet (receptacle) 25. The station (which actually consists of an adapter and a terminal device) can be plugged into wall outlet 25. Functional units 27 of the station, which include e.g. a receiver, a transmitter and a protocol handler in an adapter portion and a microprocessor, a storage, and display unit in a device portion are connected via transformers 29 (TR3) and 31 (TR4) to the connecting plug.

When switches R1 and R2 are in the positions as shown, the station is bypassed and the ring closed. A wrap-around connection is available for testing the station. When both switches are activated, ring 11 is interrupted and the station inserted. Data from the ring are then transferred into the station via R1, TR1, extension line 21 and TR3. Data from the station are transferred to the ring via TR4, extension line 23, TR2 and R2.

Switching of relays in the distribution panel is effected in the present embodiment by dc control signals from the station. Switch control unit 33, when receiving respective commands from the station, furnishes either a direct current I1, or an opposite direct current I2 through transformers TR3 and TR4 to extension lines 21 and 23. A switch control unit 35 in the distribution panel receives through transformers TR1 and TR2 these direct currents and can activate distribution panel switches R1 and R2. More details will be explained later.

Instead of using the data transfer extension lines for additionally conveying dc switch control signals, one could provide separate extension lines for these control signals but this would be of course more expensive and thus is not desirable.

For the key insertion procedure according to the invention, each port of a distribution panel comprises following elements as shown in FIG. 2: An additional relay switch 37 (R3) by which a loop comprising a receiver 39, a read-only store (ROS) and timing unit 41, and a sender 43 can be inserted between the incoming and outgoing paths. The read-only store holds the physical address or key of the respective port. Further units to be used in the key insertion procedure are a signal pattern generator 45 and a key register 47 in the station. They are shown separately in FIG. 2 but may be parts of other ones of the functional units 27 of the station, e.g. of the timing circuitry and of the storage of its adapter portion.

Switch control unit 35, in response to a dc control signal from the attached station, also controls the operation of switch R3, and further furnishes power to units 39, 41 and 43 when they are operating. This power is not available in the distribution panel but is transmitted from the attached station, as will be explained later.

Key Insertion Procedure:

When a station is plugged into the wall outlet of a distribution panel and power is switched on, a dc control current I1 is generated (e.g. by operating a push button) which in turn causes via switch control unit 35 the following: (a) switching over of relay contact R3, and (b) furnishing of power to receiver 39, ROS and timing unit 41, and sender 43. Thus, these units become operable and are inserted into the wrap-around loop.

Thereafter, a rectangular pulse sequence which can be considered idling data is furnished from generator 45 through TR4, line 23, TR2, R3 and receiver 39 to ROS and timing unit 41. The latter differentiates the pulse sequence to generate a local clock signal, and with the aid of this clock a stored short message including the desired key (i.e. the physical address) is read from the ROS and transferred from there via sender 43, R1, TR1, line 21 and TR3 to the station. There the key will be stored in key register 47.

After this key insertion procedure, the station will cause a dc control current I2 (having opposite polarity with respect to I1) which in turn, through switch control unit 35, will result in switching of relay contacts R1 and R2 so that the station is inserted into ring 11. The local key in register 47 will remain available as long as the station remains inserted through the respective port.

Figure 3:
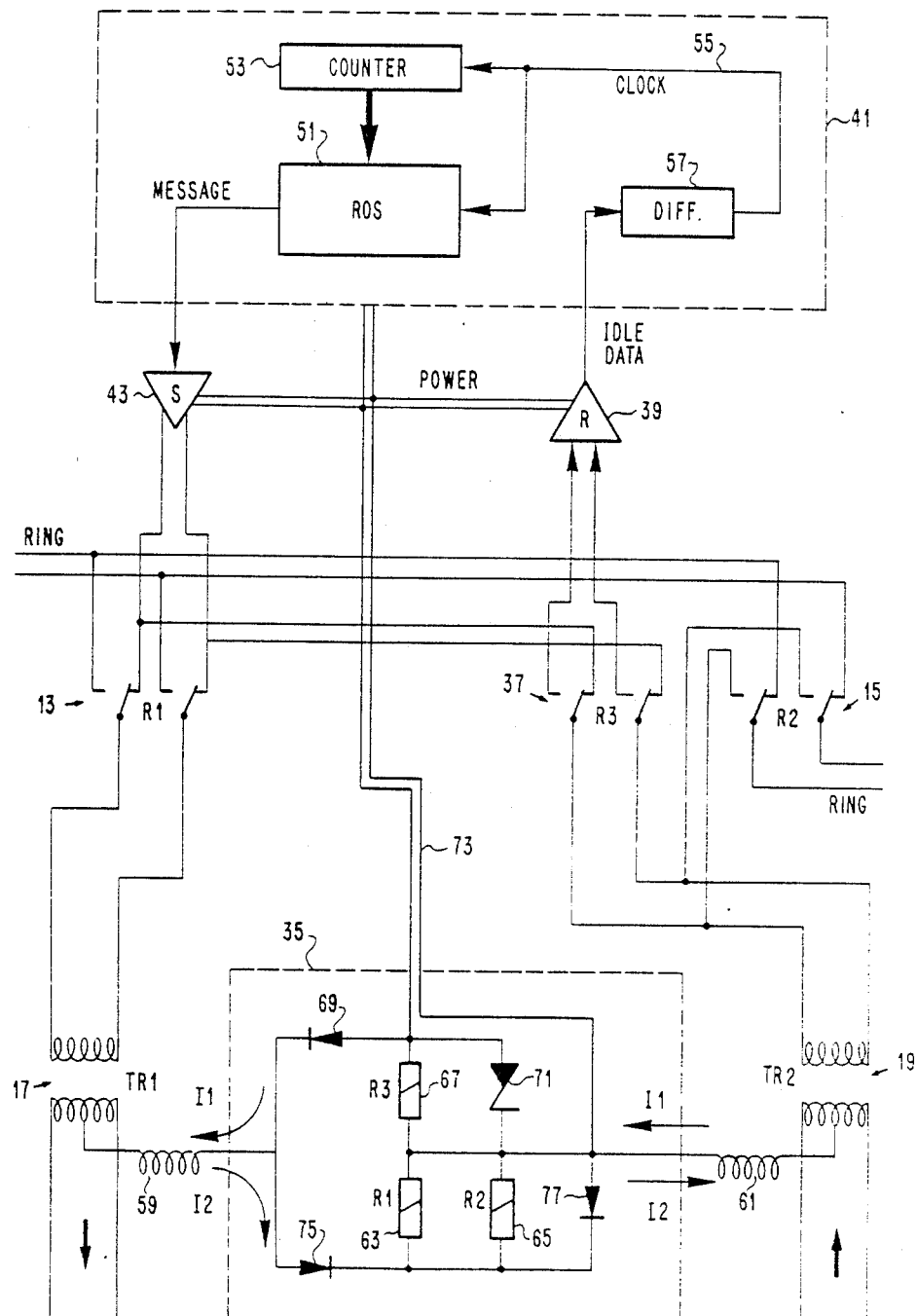
FIG. 3 is a more detailed diagram of the elements of a port in a distribution panel used for physical address acquisition, in connection with relay switches.

Details in Distribution Panel and Station:

FIG. 3 shows some details of switch control unit 35 and of ROS and timing unit 41 of a distribution panel port. The main portion of unit 41 is a read-only store (ROS) 51 containing a stored message that includes the key or address of the respective port. The ROS can be of any known design and therefore need not be described here. For changing the key, a circuit card containing the ROS could be replaced.

Figure 6:
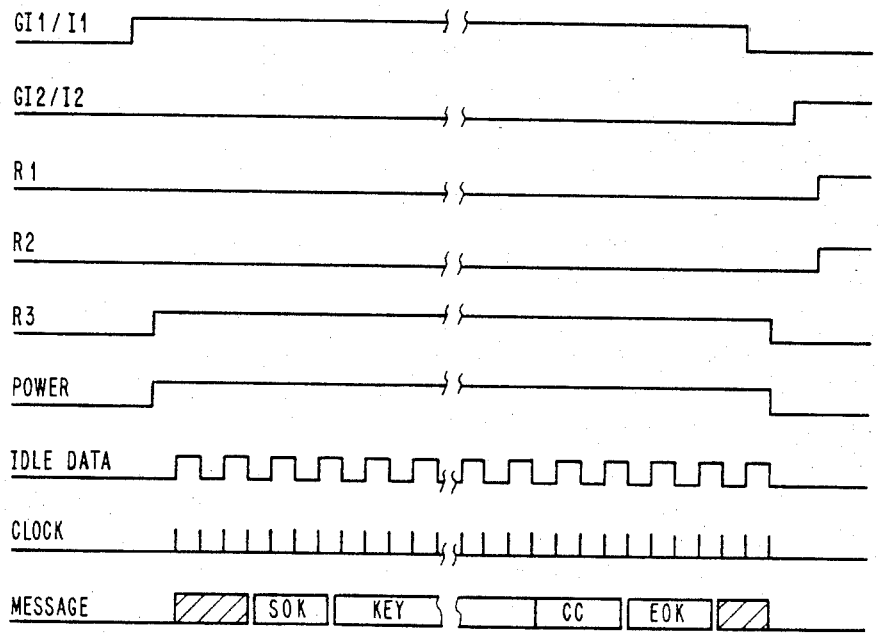
FIG. 6 is a timing diagram showing the message format for the local identification key in relation to various control and timing signals.

The message which includes the key is shown in FIG. 6. It comprises a start delimiter SOK comprising a code violation to enable synchronization, a sequence of characters constituting the actual key, a check character CC for the key sequence, followed by an end delimiter EOK. Of course, identical delimiters could be used for identifying start and end of the key (this would require slightly modified circuitry).

A counter 53 (FIG. 3) is provided for addressing the ROS. Clock signals on a line 55 are used for advancing the counter during a readout procedure, and the same clock signals are used for timing the read accesses in ROS 51. The clock signal is furnished by a differentiating circuit 57 which on its input receives the idling data sequence (sequence of alternating zero and one pulses) from receiver 39. The message read out from ROS 51 is furnished to sender 43. In this embodiment, the key is stored in the ROS in a form directly suited for transmission, e.g. each data bit of the key is represented by two opposite half-bits (either 1-0 or 0-1) in ROS and during transmission when a Manchester code is used as transmission code.

Switch control unit 35 is connected to middle taps of transformers 17 (TR1) and 19 (TR2) through inductances 59 and 61 so that it can receive direct currents provided from the attached station through a phantom circuit. As was mentioned earlier, two extra control lines could be used for the dc control currents instead of the phantom circuit.

Switch control unit 35 actually includes coils 63, 65 and 67 of relays R1, R2 and R3, respectively. The coil of R3 is connected in series with a diode 69 between the transformer center taps so that R3 is energized only when a direct current I1 as shown is present. The voltage drop across coil 67 of R1 and across parallelconnected Zener diode 71 is furnished by line 73 to receiver 39, to functional elements (51, 53) in ROS and timing unit 41, and to sender 43 for powering them as long as I1 is flowing.

The coils of R1 and R2, joined in parallel, are connected in series with a diode 75 between the transformer center taps so that R1 and R2 are energized only when a direct current I2 as shown is present. A diode 77 is provided to avoid a voltage peak when I2 is switched off.

Figure 4:
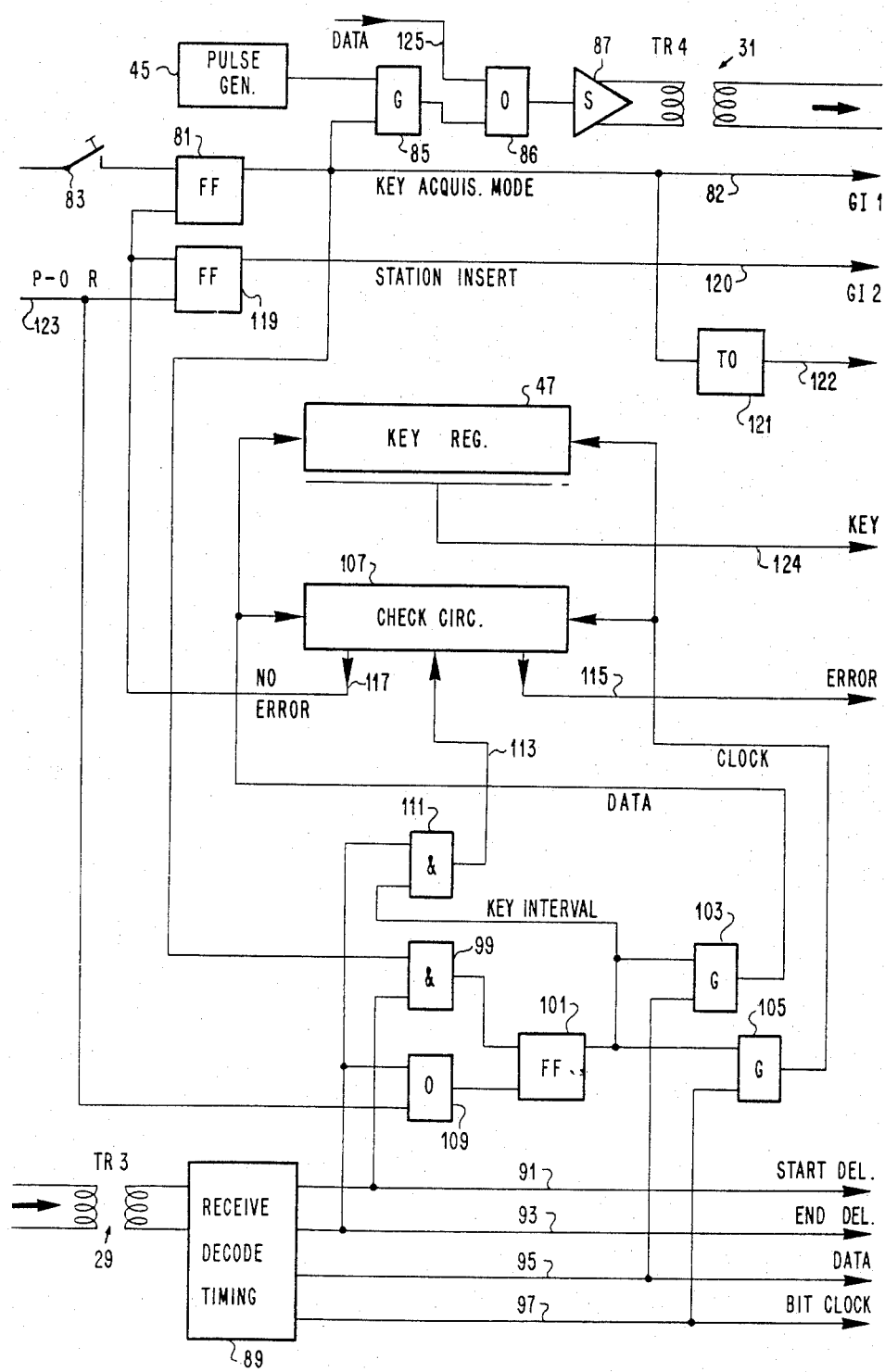
FIG. 4 is a more detailed diagram of the involved elements in a station which is to acquire the local identification key.

In FIG. 4 those elements of a station are shown which are used for the key insertion procedure (except for switching control unit 33 which is explained in connection with FIG. 5).

A bistable circuit 81 is set by closing a contact 83 (either manually or automatically) when the station is plugged in and power is switched on. The output of bistable circuit 81 on line 82 is a control signal GI1 which gates dc switch control current I1 and indicates "key acquisition mode". This control signal opens a gating circuit 85 which then gates the rectangular pulses from pulse generator 45 through an OR gate 86 to a sender 87. The output of sender 87 is applied through transformer TR4 as idling data sequence to the extension line and thus is forwarded to the distribution panel where it is used to clock read-out of the key message. This message is furnished through transformer TR3 (lower left of FIG. 4) to a receiver, decoder and timing circuitry 89. This circuitry recognizes start delimiters and end delimiters in the data stream and furnishes respective control pulses on lines 91 and 93 to the station. It further converts the received data from transmission code (e.g. Manchester Code) into the code used by the station, and furnishes the data bits sequentially (and with a delay of one byte or character) on line 95 to the station. On line 97, receiving, decoding and timing ciruitry 89 furnishes a bit clock signal derived from the received data stream.

When during key acquisition mode the start delimiter of the key message is received, the control pulse on line 91 sets, via AND gate 99, a bistable circuit 101 the output signal of which is active during the key interval, i.e. when the key between its start delimiter and end delimiter is received. This "key interval" signal opens gating circuits 103 and 105.

These gating circuits gate, respectively, the received data bits (i.e. the key bits) from line 95 and the corresponding bit clock pulses from line 97, to the station's key register 47 and to a check circuit 107. Thus, the sequentially received bits of the key (physical port address) are shifted into the key register, and a check character is simultaneously generated in check circuit 107 to finally compare it to the received check character of the key.

When the end delimiter of the key message is received, the resulting pulse on line 93 resets, via OR gate 109, bistable circuit 101 to indicate that the key interval has ended, and to close gating circuits 103 and 105. Before the output signal of bistable circuit 101 is deactivated, AND gate 111 transfers the end delimiter control pulse on line 113 to check circuit 107 which will then furnish an error signal on output line 115 if the key was not received error-free. This signal can invoke any desired diagnostic procedure.

Such diagnostic or error recovery procedure could be delayed, however, until a key transmission error was indicated on line 115 a preselected number of times (e.g. three times). In the meantime, the key message would be repeatedly transmitted, because advancing of the ROS addressing counter would continue (bistable circuit 81 not yet reset, idling data sequence continues to be transmitted), and the ROS address would wrap around to start again read-out of the key message.

If, however, check circuit 107 detected no error, it will issue a respective pulse on line 117. This pulse will reset bistable circuit 81 so that control signal GI1 is deactivated and gate 85 is closed to stop transmission of the idling data sequence. The no-error signal will also set a bistable circuit 119 to cause station inserting by control signal GI2 on line 120 (gate direct current I2 for switching R1 and R2).

A time-out circuit 121 is connected to line 82 and is triggered when the key acquisition mode signal or GI1 signal is activated. If the key is not received within a preselected time interval, a respective error signal is activated on line 122.

Bistable circuits 101 and 119 are initially reset by a power-on-reset pulse (P-O-R) on line 123 when the station is plugged-in and power is switched on.

After end of the key insertion procedure, the key or physical address of the respective port is maintained in key register 47 and is available on output line 124. As was mentioned earlier, the key register could also be part of a storage and would then be available by accessing the predetermined address of that register.

Sender 87 and transformer TR4 can of course also be used for normal data transmission from the station. These data may be available on line 125 and then applied through OR gate 86 to sender 87.

Figure 5:
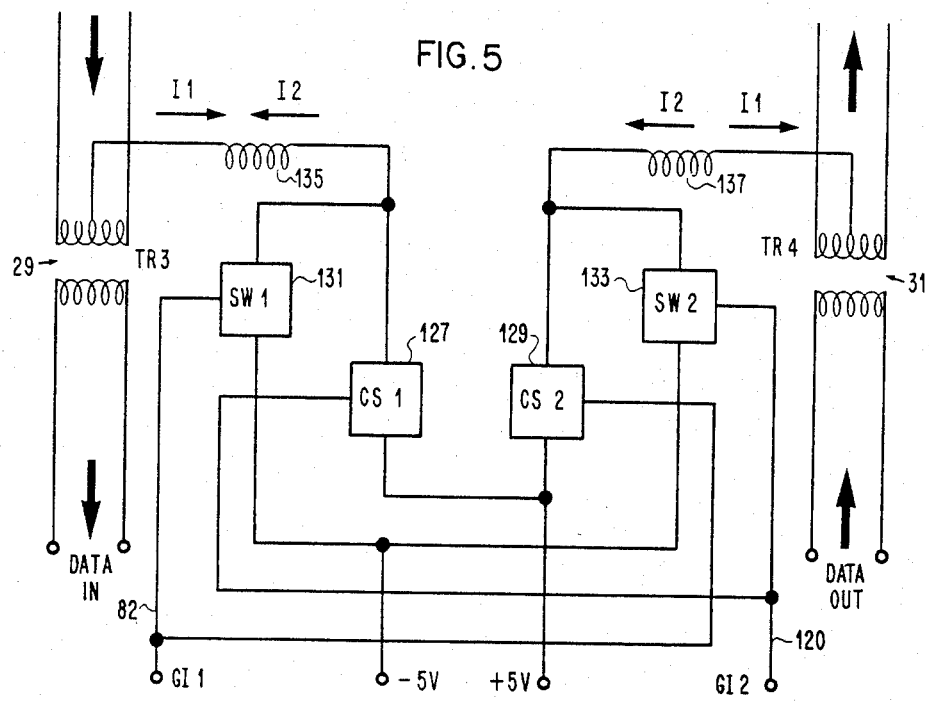
FIG. 5 shows details of the circuitry of a station used for generating key acquisition and station insertion demand or control signals.

FIG. 5 shows some details of switch control unit 33 of a station. As was mentioned already in connection with FIG. 1, switch control unit 33 is connected to transformers 29 (TR3) and 31 (TR4) and serves for furnishing, in response to respective control signals GI1 and GI2 from the station, either a direct current I1 or a direct current I2 which is of opposite direction, through a phantom circuit constituted by the wire pairs of lines 21 and 23 to the associated outlet of a distribution panel.

Switch control unit 33 receives the control signals GI1 and GI2 on lines 82 and 120 from the circuitry shown in FIG. 4, and it is further connected to a +5 V and a −5 V terminal of the station's power supply. It comprises two current source circuits 127 (CS1) and 129 (CS2) each furnishing a constant current when a control signal is active on its control input, and two switching circuits 131 (SW1) and 133 (SW2) each opening or closing a current path when a respective control signal is present on its control input. These elements are connected to each other as shown in FIG. 5, and they are further connected through inductances 135 and 137 (for protection) to the center taps of transformers TR3 and TR4, respectively.

Operation is as follows: When no control signal is active, no direct current is furnished. When control signal GI1 is active, it opens switch SW1 and activates current source CS2 so that a direct current I1 flows from the +5 V terminal through CS2, inductance 137, transformer TR4, from there to the distribution panel and back through transformer TR3, inductance 135, and switch SW1 to the −5 V terminal. When control signal GI2 is active, it opens switch SW2 and activates CS1 so that a direct current I2 flows from the +5 V terminal through CS1, inductance 135, transformer TR3, from there to the distribution panel and back through transformer TR4, inductance 137, and switch SW2 the −5 V terminal.

By this arrangement, the two direct currents can be selectively generated and furnished to a port of the distribution panel for controlling the setting of its relay switches and for providing power to some of its elements.

A timing diagram of the whole key insertion procedure is given in FIG. 6. Activation of GI1 and I1 cause after a short delay the switching of R3 and the furnishing of power to the ROS and associated units (39, 41, 43) in the distribution panel. Also in response to GI1, idling data will be received in the distribution panel and will be converted to clock pulses for the read-only storage and its addressing counter.

As the counter will not be initially reset, reading out of ROS starts at any arbitrary location, so that the message transferred from the ROS to the station has a leading non-significant portion (shaded area). At some point in time, the actual message will start by an SOK character (start delimiter), followed by the key characters and a check character CC, after which the end delimiter EOK follows. This end delimiter is recognized in the receiving circuitry of the station which causes deactivation of GI1 and I1. In response to that, R3 is switched back and the power for the ROS and associated units (39, 41, 43) ceases after a short delay. Idling data are also no longer transferred. As a consequence, reading of data out of the ROS stops, and the addressing counter stops at an arbitrary position (non-significant trailing part of the message shown as shaded portion).

Detection of the end delimiter causes an interrogation of the key checking circuit which after a short delay issues a positive response signal which causes activation of control signal GI2 and of direct current I2. This current is used in the distribution panel to switch the contacts of relays R1 and R2, thereby inserting the station into the transmission ring.

After this key acquisition and station insertion procedure, the inserted station will start to synchronize to the data stream on the ring. After synchronization, it can use the acquired key or physical address for identifying itself to other stations on the ring or to a central directory unit. The key may serve different functions: It can either be used as the single permanent address of the station, or it can be used as a system internal address for network maintenance procedures, whereas another, external system address for the system users is additionally assigned in a separate procedure, or the key can be used only as temporary address to enable efficient acquisition of a permanent address with the aid of an address server.

We claim:

1. Method for providing a unique local identification to a station when it is connected to a transmission medium via a connecting port, characterized by sending a signal pattern from said station to said port;

sending an identification demand indication from said station to said port; and sending from said port, in response to said demand indication and under control of said signal pattern, an identification stored at said connecting port and storing said identification in the respective station.

2. Method in accordance with claim 1, characterized in that sending of the stored identification from said port is repeated a predetermined number of times if an error in said identification is detected in the respective station.

3. Method in accordance with claim 1, characterized in that a clock signal is derived from said signal pattern in said port, and that a count value is accumulated in response to pulses of said clock signal, for addressing a storage containing said identification.

4. Arrangement for loading a local identification key into a station when it is connected to a transmission network by a connecting port, characterized in that it comprises in said station (FIG. 4, FIG. 5):
means (45, 85, 86, 87) for transmitting an idling signal pattern,
means (81, 82, 129, 131, 135, 137) for generating a key demand indication signal, and
means (47, 101, 103, 105) for storing a local identification key when it is received from said connecting port;

in said connecting port (FIG. 3):
means (51) for storing a local identification key for the respective port,
means (39, 55, 57) for deriving a timing signal from an idling signal pattern received from a station being connected, and
means (43, 53) for reading the local identification key from said storing means under control of said timing signal and for transmitting it to said station when said demand indication signal is received.

5. Arrangement in accordance with claim 4, characterized in that power for said storing means (51) and said reading and transmitting means (43, 53) is furnished through special circuitry (33, 35, 73) from said station to said port during presence of said key insertion demand signal (I1).

6. Arrangement in accordance with claim 4, characterized in that said key demand indication signal generating means (81, 82, 129, 131, 135, 137) include circuitry (129, 131, 135, 137) for providing a direct current (I1) as key demand indication signal and for applying said direct current to the lines (21, 23) interconnecting the respective station to said port.

7. Arrangement in accordance with claim 6, characterized in that said port comprises circuitry (59, 61, 67, 69, 71, 73) for using the direct current constituting said key demand indication signal (I1) for powering said storing means (51) and said reading and transmitting means (43, 53).

8. Arrangement in accordance with claim 4, characterized in that a switch (37) is provided in said connecting port, which is responsive to said key demand indication signal (I1) for interrupting a wraparound path between an incoming and an outgoing connection to said station, and for inserting into said wrap-around path said storing means (51), said timing signal deriving means (39, 55, 57) and said reading and transmitting means (43, 53).

9. Arrangement in accordance with claim 4, characterized in that said reading and transmitting means (43, 53) in said connecting port include a counter (53) for addressing said storage means (51), which is connected to said timing signal deriving means (39, 55, 57) and which is advanced by the timing signal pulses.

10. Arrangement in accordance with claim 9, characterized in that said counter (53) is a wrap-around counter so that locations of said storage means (51) which are addressed by the contents of said counter are repetitively read out as long as a timing signal is derived from said idling signal pattern.

* * * * *